(12) United States Patent
Yokota et al.

(10) Patent No.: US 12,377,495 B2
(45) Date of Patent: Aug. 5, 2025

(54) SURFACE TREATMENT METHOD

(71) Applicant: TOCALO CO., LTD., Kobe (JP)

(72) Inventors: Hiroki Yokota, Akashi (JP); Daisuke Kawai, Akashi (JP)

(73) Assignee: TOCALO CO., LTD., Kobe (JP)

(*) Notice: Subject to any disclaimer, the term of this patent is extended or adjusted under 35 U.S.C. 154(b) by 785 days.

(21) Appl. No.: 17/637,790

(22) PCT Filed: Aug. 20, 2020

(86) PCT No.: PCT/JP2020/031473
§ 371 (c)(1),
(2) Date: Feb. 23, 2022

(87) PCT Pub. No.: WO2021/039588
PCT Pub. Date: Mar. 4, 2021

(65) Prior Publication Data
US 2022/0281033 A1    Sep. 8, 2022

(30) Foreign Application Priority Data
Aug. 23, 2019   (JP) ................. 2019-152681

(51) Int. Cl.
*B23K 26/352* (2014.01)
*B23K 26/0622* (2014.01)
*C23C 4/18* (2006.01)

(52) U.S. Cl.
CPC ...... *B23K 26/3568* (2018.08); *B23K 26/0622* (2015.10); *C23C 4/18* (2013.01)

(58) Field of Classification Search
CPC ............. B23K 26/3576; B23K 26/364; B23K 26/032; B23K 26/354; B23K 26/361;
(Continued)

(56) References Cited

U.S. PATENT DOCUMENTS

| | | | |
|---|---|---|---|
| 4,122,240 A | 10/1978 | Banas et al. | |
| 6,043,452 A | 3/2000 | Bestenlehrer | |

(Continued)

FOREIGN PATENT DOCUMENTS

| | | |
|---|---|---|
| CN | 1576263 A | 2/2005 |
| CN | 101389886 A | 3/2009 |

(Continued)

OTHER PUBLICATIONS

Office Action issued on Feb. 15, 2024 in corresponding Taiwanese Patent Application No. 109128459.

(Continued)

*Primary Examiner* — Chris Q Liu
(74) *Attorney, Agent, or Firm* — Knobbe, Martens, Olson & Bear, LLP

(57) ABSTRACT

A surface treatment method is for processing a surface of a substrate. The method includes irradiating a surface having unevenness with a laser beam satisfying all of the three following requirements: a power density in a range with a radius of 25 μm from a center of a laser beam spot is $1.0 \times 10^3$ to $1.0 \times 10^5$ kW/cm$^2$; a power density of an entire laser beam spot is 0.08 to 0.12 times the power density in the range with the radius of 25 μm from the center of the laser beam spot; and an action time in the range with the radius of 25 μm from the center of the laser beam spot is $1.7 \times 10^{-6}$ to $1.0 \times 10^{-5}$ seconds. The method leaves a certain roughness on the surface of the substrate while removing fine and sharp protrusions on the surface.

4 Claims, 10 Drawing Sheets

(58) Field of Classification Search
CPC .... B23K 26/00; B23K 26/04; B23K 26/0665; B23K 26/082; B23K 26/10; B23K 26/352; B23K 26/355; B23K 26/359; B23K 26/362; B23K 26/40; B23K 26/0006; B23K 26/034; B23K 26/0624; B23K 26/0626; B23K 26/123; B23K 26/244; B23K 26/32; B23K 26/322
USPC .............. 219/121.17, 121.6, 121.62, 121.65, 219/121.66, 121.69, 121.83
See application file for complete search history.

(56) References Cited

U.S. PATENT DOCUMENTS

| | | |
|---|---|---|
| 2005/0016969 A1 | 1/2005 | Kessler et al. |
| 2006/0081573 A1 | 4/2006 | Wissenbach et al. |
| 2009/0026712 A1 | 1/2009 | Kawanishi et al. |
| 2018/0066334 A1 | 3/2018 | Mogi et al. |
| 2018/0142338 A1 | 5/2018 | Yokota et al. |
| 2019/0003695 A1 | 1/2019 | Rouse et al. |
| 2019/0048434 A1 | 2/2019 | Mizumura et al. |

FOREIGN PATENT DOCUMENTS

| | | |
|---|---|---|
| CN | 107406935 A | 11/2017 |
| CN | 108779510 A | 11/2018 |
| CN | 109210520 A | 1/2019 |
| DE | 29505985 U1 | 7/1995 |
| DE | 10342750 A1 | 4/2005 |
| DE | 102012219934 A1 | 4/2014 |
| DE | 102017201872 A1 | 8/2018 |
| EP | 3406392 A1 | 11/2018 |
| FR | 2944463 A1 | 10/2010 |
| JP | 2007-209992 A | 8/2007 |
| JP | 2010-189228 A | 9/2010 |
| JP | 2015-174103 A | 10/2015 |
| JP | 2016-044337 A | 4/2016 |
| JP | 2016-078091 A | 5/2016 |
| WO | WO 2016/170895 A1 | 10/2016 |

OTHER PUBLICATIONS

Extended European Search Report dated Jun. 14, 2023 for European Patent Application No. 20856334.6; 7 pages.
Office Action dated Mar. 27, 2024 in Chinese Patent Application No. 202080058524.X in 15 pages.
International Search Report mailed on Oct. 13, 2020, in International Application No. PCT/JP2020/031473.
Written Opinion mailed on Oct. 13, 2020, in International Application No. PCT/JP2020/031473.

[FIG. 1]
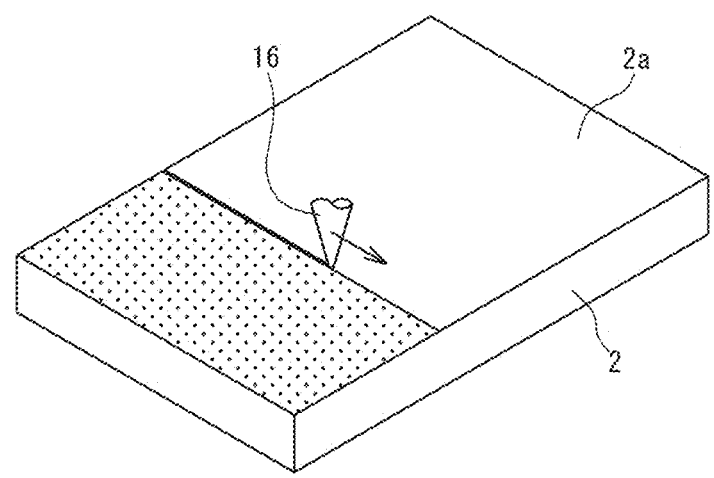

[FIG. 2]
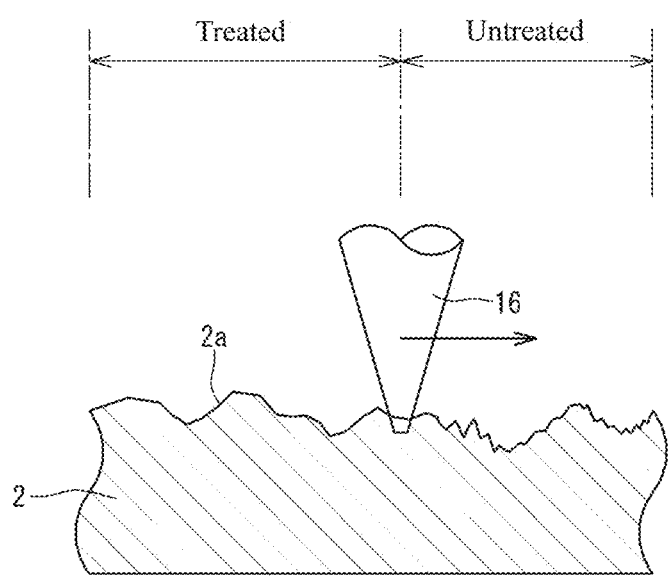

[FIG. 3]
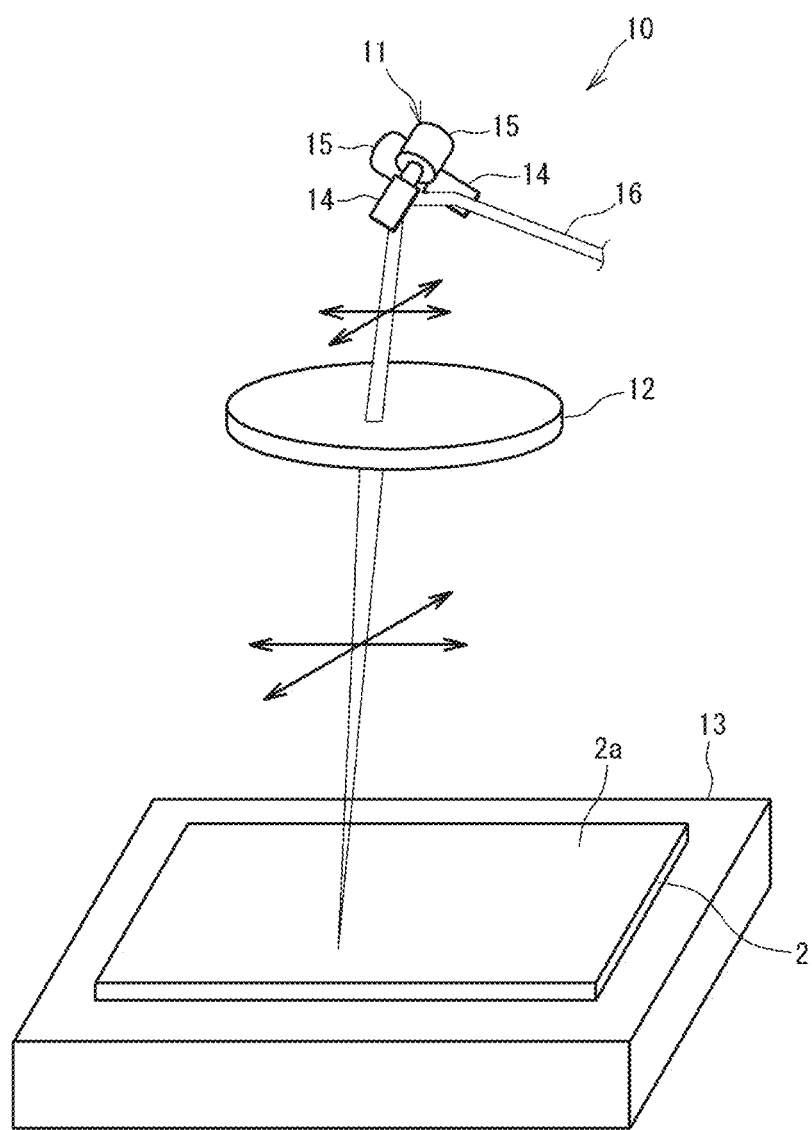

[FIG. 4]
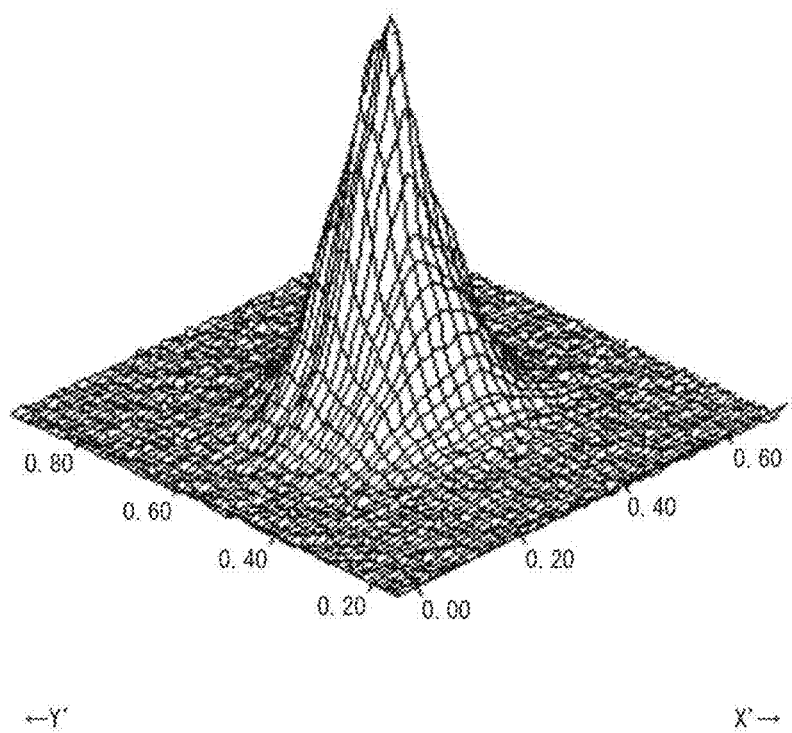

[FIG. 5]
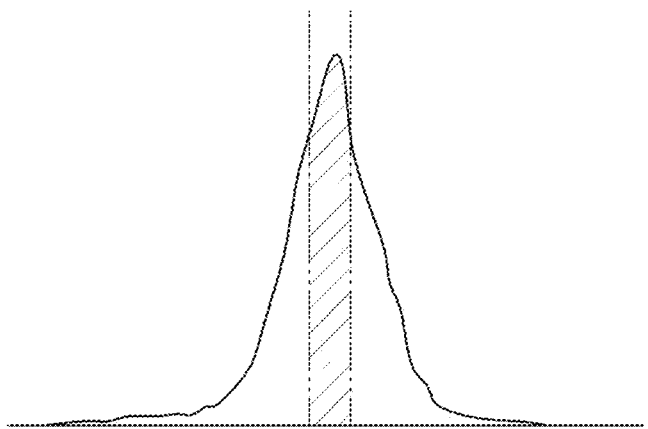

[FIG. 6]
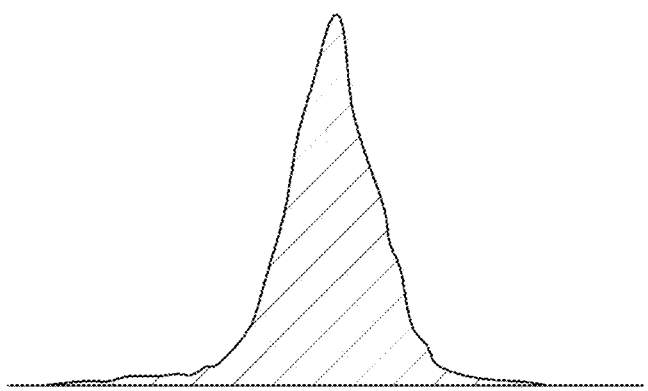

[FIG. 7]
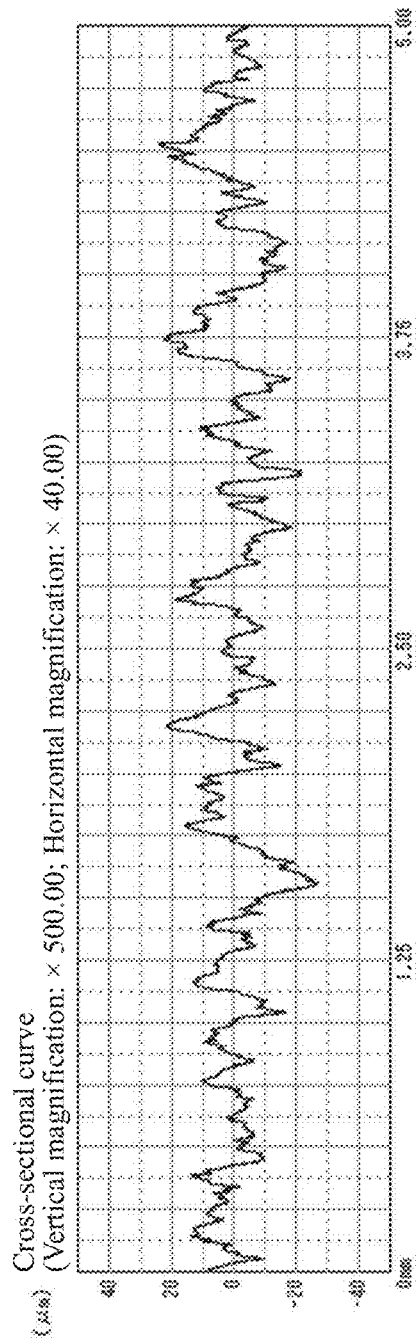

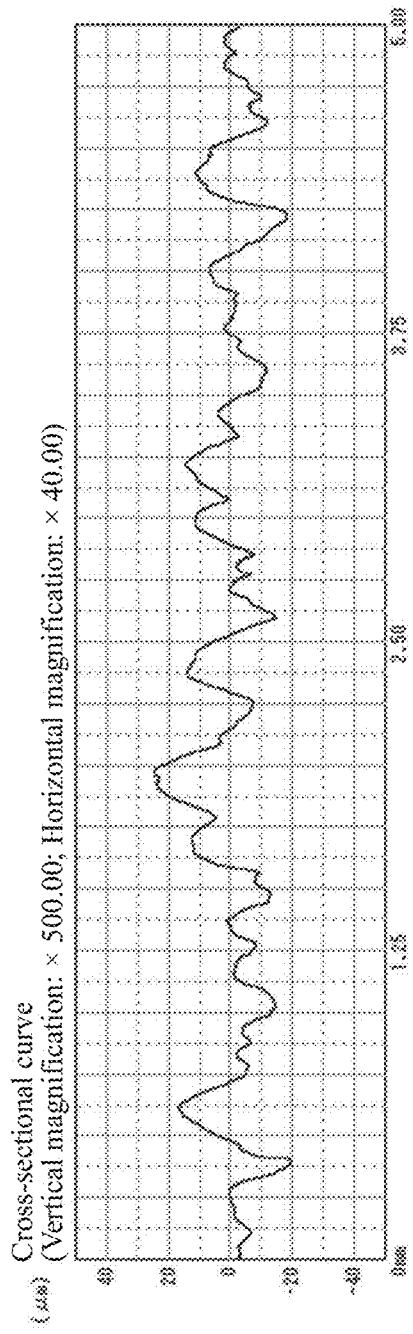
[FIG. 8]

[FIG. 9]
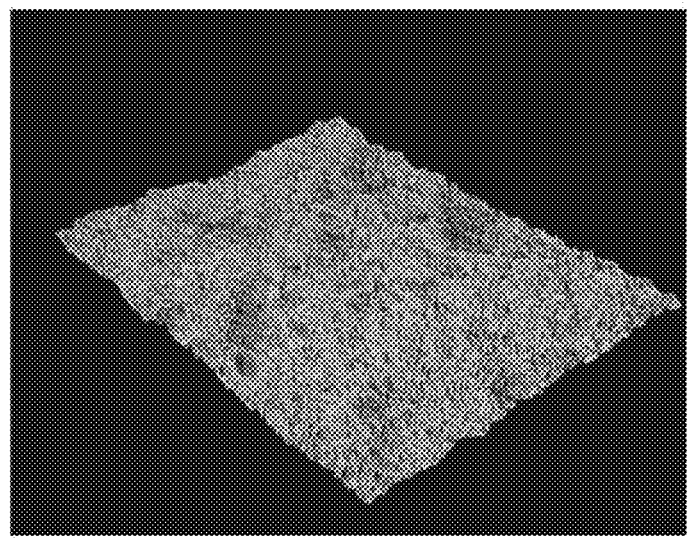

[FIG. 10]
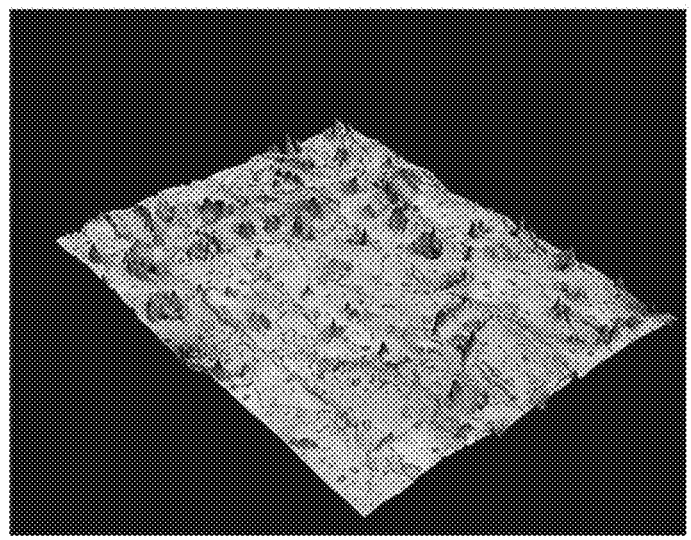

SURFACE TREATMENT METHOD

PRIORITY AND CROSS REFERENCE TO RELATED APPLICATIONS

This application is the U.S. National Stage Application under 35 U.S.C. § 371 of International Application No. PCT/JP2020/031473, filed Aug. 20, 2020, which claims the benefit of Japanese Application No. JP 2019-152681, filed Aug. 23, 2019. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present invention relates to a surface treatment method by using a laser beam.

BACKGROUND ART

In recent years, with development of laser oscillators, various processing procedures by a laser beam have become possible, and laser processing is used also for the purpose of controlling surface morphology of a substrate such as roughening and flattening a surface of the substrate. For example, Patent Literature 1 describes a method for roughening a surface of a ceramic substrate by irradiating the ceramic substrate with a laser beam.

The laser processing is a useful technique, but it also has some problems. For example, when grooving with a laser beam is performed, burrs may be generated due to accumulation of residues around an opening of grooves. The generated burrs cause problems such as spoiling an appearance of a product or scratching an object contacting with a product. As a method for removing such burrs, a method is known in which conditions are set again in order to remove burrs after laser processing is performed, and then, laser processing is performed again, as in Patent Literatures 2 and 3.

CITATION LIST

Patent Literature

[Patent Literature 1] International Publication No. WO 2016/170895
[Patent Literature 2] Japanese Laid-Open Patent Publication No. 2007-209992
[Patent Literature 3] Japanese Laid-Open Patent Publication No. 2015-174103

SUMMARY OF INVENTION

Not limited to an example of burrs, there are often cases where other problems occur when laser processing is performed to achieve a certain purpose, in the field of laser processing.

For example, if there are fine and sharp protrusions on a surface of equipment such as rolls and pulleys for conveying articles such as plates, paper, films, and threads, a surface of the articles will possibly be scratched when the articles are conveyed. However, on the other hand, if the entire conveying surface is flattened by laser processing for smoothing, the conveyed articles may slip and the original function of the equipment may be impaired. Thus, there is a demand for a measure for obtaining a surface shape having low aggression while maintaining the minimum grip performance required for holding articles.

Further, for example, if fine and sharp protrusions remain on a surface of sliding components such as a cylinder and a guide, there is a risk of attacking a mating material during sliding. However, on the other hand, if the entire sliding surface is flattened by laser processing for smoothing, it may not be possible to retain a lubricant such as an oil. Therefore, there is a demand for a measure for obtaining a surface shape having low aggression against the mating material while maintaining the minimum roughness capable of retaining the lubricant.

The present invention has been made to solve the above-mentioned problems of the prior art, and has an object of providing a surface treatment method which leaves a certain roughness on a surface of a substrate while removing fine and sharp protrusions on the surface.

In order to solve the above problems, the present inventors have first verified what kind of change should be observed in surface roughness parameters before and after laser beam irradiation. As a result, it has been found that simultaneous satisfying the following requirement (a) and at least one of the following requirements (b) and (c) is one criterion for realizing the above surface treatment method, when focusing on a line roughness. Further, it has been found that simultaneous satisfying the following requirement (d) and at least one of the following requirements (e) and (f) is one criterion for realizing the above surface treatment method, when focusing on an area roughness.

The requirements (a) to (c) are as follows.
(a) A surface roughness Ra' of a surface to be treated after laser beam irradiation is 0.80 times or more and 1.20 times or less an initial surface roughness Ra.
(b) A surface roughness RSm' of the surface to be treated after the laser beam irradiation is 1.10 times or more an initial surface roughness RSm.
(c) A surface roughness Pc' of the surface to be treated after the laser beam irradiation is 0.90 times or less an initial surface roughness Pc.

The requirements (d) to (f) are as follows.
(d) A surface roughness Sa' of the surface to be treated after the laser beam irradiation is 0.80 times or more and 1.20 times or less an initial surface roughness Sa.
(e) A surface roughness Spc' of the surface to be treated after the laser beam irradiation is 0.90 times or less an initial surface roughness Spc.
(f) A surface roughness Spd' of the surface to be treated after the laser beam irradiation is 0.90 times or less an initial surface roughness Spd.

However, as a result of verification, the present inventors faced a problem that there is a trade-off relationship in which minute protrusions can be removed, in contrast, the entire surface to be treated becomes flat or is dug too deeply and the roughnesses (specifically, the arithmetic average roughnesses in a height direction (Ra, Sa)) become large, under general laser beam processing conditions. That is, a method for simultaneously satisfying the requirement (a) and at least one of the requirements (b) and (c), or a method for simultaneously satisfying the requirement (d) and at least one of the requirements (e) and (f) has not been established so far. Then, as a result of repeated experiments by the present inventors, it has been found that irradiating a surface of a substrate, which has unevenness with a surface roughness Ra of 2.0 μm or more and/or a surface roughness Sa of 2.0 μm or more, with a laser beam satisfying all of the following requirements (i) to (iii) is effective in realizing the required change in the above surface roughness parameters.

That is, the present invention is a surface treatment method including a step of irradiating a surface of a substrate, which has unevenness with a surface roughness Ra of 2.0 μm or more and/or a surface roughness Sa of 2.0 μm or more, with a laser beam satisfying all of the following requirements (i) to (iii) to process the surface.
  (i) A power density in the range with a radius of 2.5 μm from the center of a laser beam spot is $1.0 \times 10^3$ to $1.0 \times 10^5$ kW/cm².
  (ii) A power density of the entire laser beam spot is 0.08 to 0.12 times the power density in the range with the radius of 25 μm from the center of the laser beam spot.
  (iii) An action time in the range with the radius of 25 μm from the center of the laser beam spot is $1.7 \times 10^{-6}$ to $1.0 \times 10^{-5}$ seconds.

According to the present invention, it is possible to perform processing which simultaneously satisfies the following requirement (a) and at least one of the following requirements (b) and (c).
  (a) The surface roughness Ra' of the surface to be treated after the laser beam irradiation is 0.80 times or more and 1.20 times or less the initial surface roughness Ra.
  (b) The surface roughness RSm' of the surface to be treated after the laser beam irradiation is 1.10 times or more the initial surface roughness RSm.
  (c) The surface roughness Pc' of the surface to be treated after the laser beam irradiation is 0.90 times or less the initial surface roughness Pc.

According to the present invention, it is possible to perform processing which simultaneously satisfies the following requirement (d) and at least one of the following requirements (e) and (f).
  (d) The surface roughness Sa' of the surface to be treated after the laser beam irradiation is 0.80 times or more and 1.20 times or less the initial surface roughness Sa.
  (e) The surface roughness Spc' of the surface to be treated after the laser beam irradiation is 0.90 times or less the initial surface roughness Spc.
  (f) The surface roughness Spd' of the surface to be treated after the laser beam irradiation is 0.90 times or less the initial surface roughness Spd.

Regarding the above requirements (a) to (f), it is preferable to further satisfy the following requirements (a') to (f') in order to achieve more remarkable effects.
  (a') The surface roughness Ra' of the surface to be treated after the laser beam irradiation is 0.90 times or more and 1.10 times or less the initial surface roughness Ra.
  (b') The surface roughness RSm' of the surface to be treated after the laser beam irradiation is 1.20 times or more the initial surface roughness RSm.
  (c') The surface roughness Pc' of the surface to be treated after the laser beam irradiation is 0.60 times or less the initial surface roughness Pc.
  (d') The surface roughness Sa' of the surface to be treated after the laser beam irradiation is 0.90 times or more and 1.10 times or less the initial surface roughness Sa.
  (e') The surface roughness Spc' of the surface to be treated after the laser beam irradiation is 0.80 times or less the initial surface roughness Spc.
  (f') The surface roughness Spd' of the surface to be treated after the laser beam irradiation is 0.80 times or less the initial surface roughness Spd.

The unevenness of the surface of the substrate may be formed by at least one pretreatment selected from laser processing, machine processing, blasting, and etching.

The surface of the substrate, which has the unevenness, is preferably a coating layer formed on a body of the substrate, and the coating layer is preferably a thermal sprayed coating.

According to the present invention, it is possible to perform surface treatment which leaves the surface roughness as a whole while removing fine and sharp protrusions on the surface.

BRIEF DESCRIPTION OF THE DRAWINGS

FIG. 1 is a schematic perspective view which shows an example of surface treatment by using a laser beam, according to an embodiment of the present invention.

FIG. 2 is a schematic enlarged cross-sectional view as seen from a direction orthogonal to a traveling direction of the laser beam in FIG. 1.

FIG. 3 is a schematic view which shows an example of a laser processing apparatus for carrying out a surface treatment method of the present invention.

FIG. 4 is a view which shows an example of the measurement result of an output distribution of the laser beam used in the present embodiment.

FIG. 5 is a cross-sectional profile of an energy distribution shown in FIG. 4. In FIG. 5, a shaded area is the range with a radius of 25 μm from the center of a laser beam spot.

FIG. 6 is a cross-sectional profile of the energy distribution shown in FIG. 4. In FIG. 6, a shaded area is the range of the entire laser beam spot.

FIG. 7 is a cross-sectional view which two-dimensionally shows a surface shape before laser beam irradiation.

FIG. 8 is a cross-sectional view which two-dimensionally shows a surface shape after the laser beam irradiation.

FIG. 9 is a photographic view which three-dimensionally shows a surface shape before laser beam irradiation.

FIG. 10 is a photographic view which three-dimensionally shows a surface shape after the laser beam irradiation.

DETAILED DESCRIPTION

Hereinafter, one embodiment of the present invention will be described in detail. FIG. 1 is a schematic perspective view which shows an example of surface treatment by using a laser beam, according to the embodiment of the present invention. FIG. 2 is a schematic enlarged cross-sectional view as seen from a direction orthogonal to a traveling direction of the laser beam in FIG. 1.

As shown in FIGS. 1 and 2, by irradiating a surface 2a having unevenness of a substrate 2 with a laser beam 16 having a constant energy amount, a thermal reaction can be generated in a material of the surface 2a of the substrate 2 to change a surface morphology of the substrate 2. The laser beam 16 irradiates with scanning in one direction, and moves to the next row after the irradiation for one row is completed. Then, the irradiation for the next row is performed with likewise scanning in one direction, and moves to the further next row after the irradiation for the next row is completed. By repeating these operations, the entire surface to be treated is subjected to the surface treatment. The same treatment may be performed by moving a substrate side instead of scan of the laser beam 16.

Examples of the material of the surface 2a preferably include a metal, ceramics, and a cermet. The surface 2a may be a coating layer formed on a body of the substrate. The body of the substrate here refers to a material which is made of a single material such as a bulk body and is to be a strong basic structure of an article to be treated. A shape of the substrate is not limited, and may be a plate shape, a columnar shape, a disk shape, a bowl shape, a tubular shape, an annular shape, or a tapered shape, and may be a three-dimensional shape having a step in a part.

The unevenness of the surface 2a may be formed by at least one pretreatment selected from laser processing, machine processing, blasting, and etching.

Examples of a method for forming a coating layer on the body of the substrate include a thermal spraying method, a plating method, a PVD method, and a CVD method, Since fine and sharp protrusions are often formed on a surface of a coating immediately after thermal spraying, the present invention is particularly well applied when the coating layer is a thermal sprayed coating.

Examples of a metal material include a simple metal of an element selected from the group of Ni, Cr, Co, Cu, Al, Y, W, Nb, V, Ti, B, Si, Mo, Zr, Fe, Hf, and La, and alloys containing one or more of these elements.

Examples of a ceramics material include oxide ceramics, nitride ceramics, fluoride ceramics, carbide ceramics, boride ceramics, compounds containing them, and mixtures thereof.

Examples of a cermet material include those obtained by complexing one or more ceramics selected from the group of WC, $Cr_3C_2$, TaC, NbC, VC, TiC, $B_4C$, SiC, $CrB_2$, WB, MoB, $ZrB_2$, $Ti_2$, $FeB_2$, CrN, $Cr_2N$, TaN, NbN, VN, TiN, and BN with one or more metals selected from the group of Ni, Cr, Co, Cu, Al, Ta Y, W, Nb, V, Ti, Mo, Zr, Fe, Hf, and La.

A laser to be used is preferably a continuously oscillating laser, and can be arbitrarily selected from general lasers such as a fiber laser, a $CO_2$ laser, a YAG laser, a semiconductor laser, and a disk laser, according to the initial morphology and a material of the surface to be treated.

In the present embodiment, irradiation of the laser beam 16 is performed under conditions which satisfy all of the following requirements (i) to (iii).

(i) A power density in the range with a radius of 25 μm from the center of a laser beam spot is $1.0\times10^3$ to $1.0\times10^5$ $kW/cm^2$.
(ii) A power density of the entire laser beam spot is 0.08 to 0.12 times the power density in the range with the radius of 25 μm from the center of the laser beam spot.
(iii) An action time in the range with the radius of 25 μm from the center of the laser beam spot is $1.7\times10^{-6}$ to $1.0\times10^{-5}$ seconds.

Each of the power density and the action time in the present invention is defined as follows.

Power density: Output/Spot area $[=(Radius)^2 \times \pi]$.
Action time: Time required for a spot of a laser to pass an arbitrary point $[=(Radius\times2)/Scanning\ speed]$ FIG. 3 is a schematic view which shows an example of a laser processing apparatus 10 for carrying out the surface treatment method of the present invention. The laser processing apparatus 10 includes: a laser oscillator, an optical fiber, a control device, and a collimating lens, which are not shown; and a galvano scanner 11, an fθ lens 12, and an XY table 13 for moving the substrate 2 in X and Y directions, which are shown.

The laser beam emitted from the laser oscillator is transmitted by the optical fiber and is incident on the collimating lens arranged in front of the galvano scanner 11. The laser beam incident on the collimating lens is adjusted to parallel light and is incident on the galvano scanner 11. The galvano scanner 11 includes a mirror 14 and a galvano motor 15 which adjusts angles of the mirror 14, and the laser beam 16 is scanned in an arbitrary pattern by controlling the mirror 14. The XY table 13 can fix the substrate 2 and move it in the XY direction.

The control device controls: output and emission timing of the laser beam emitted from the laser oscillator; and a pattern and a scanning speed of the laser beam scanned by the galvano scanner 11, based on a processing program, processing conditions, and the like for laser processing the surface 2a of the substrate 2.

An energy distribution within a spot diameter can be controlled by appropriately combining a core diameter of the optical fiber which transmits the laser beam, a focal length of each of the collimating lens and the fθ lens 12, and a distance between the fθ lens 12 and the substrate 2.

The range of the substrate 2, which can be scanned by the galvano scanner 11, is limited. Therefore, when the processing within a scannable range is completed, the substrate 2 is moved by the XY table 13 so that an unprocessed region reaches a scannable position, and is processed again. As a result, the entire surface of the substrate 2 can be subjected to the laser processing with a pattern based on a processing program input in advance to the control device.

FIG. 4 is a view which shows an example of the measurement result of an output distribution of the laser beam used in the present embodiment. FIGS. 5 and 6 are cross-sectional profiles of an energy distribution shown in FIG. 4. As can be seen from FIGS. 4 to 6, the region having the radius of 25 μm from the center of the laser beam spot is a region having a large energy, and this region greatly contributes to imparting roughness to the surface of the substrate. The power density in the range with the radius of 25 μm from the center of the laser beam spot is set to be $1.0\times10^3$ to $1.0\times10^5$ $kW/cm^2$. When the power density is out of this range, the processing may be insufficient or may proceed too much. The reason why the power density in the range with the radius of 25 μm from the center of the laser beam spot is prescribed is that feasibility of the desired processing appears remarkably when the power density in this range is adjusted.

As shown in FIGS. 4 to 6, an intensity distribution of the laser beam used in the present embodiment holds a certain energy amount even at a position away from the vicinity of the center of the laser beam spot. In FIG. 5, the energy amount per unit area in a shaded area represents the power density in the range with the radius of 25 μm from the center of the laser beam spot. In FIG. 6, the energy amount per unit area in a shaded area represents the power density of the entire laser beam spot. When a balance of these power densities is properly set, it is possible to remove fine and sharp protrusions on the surface and create a smooth uneven surface. The power density of the entire laser beam spot is set to be 0.08 to 0.12 times the power density in the range with the radius of 25 μm from the center of the laser beam spot. When this range is not satisfied, the processing may be insufficient or may proceed too much.

Apart from the power density of the laser beam, the action time in the range with the radius of 24 μm from the center of the laser beam spot is also one of the important parameters for leaving a constant roughness while removing fine and sharp protrusions on the surface. When the action time is too short, sufficient processing will not be performed. When the action time is too long, the processing will proceed too much. The action time in the range with the radius of 25 μm from the center of the laser beam spot is set to be $1.7\times10^{-6}$ to $1.0\times10^{-5}$ seconds.

FIGS. 7 and 8 are cross-sectional views which two-dimensionally show a difference in a surface shape before and after laser beam irradiation. FIG. 7 is the view before the laser beam irradiation, and FIG. 8 is the view after the laser beam irradiation. Such a cross-sectional curve can be obtained by using, for example, a contact stylus type roughness meter. As shown in FIG. 7, a random uneven surface including fine and sharp protrusions is formed on the surface of the substrate before the laser beam irradiation. On the other hand, as shown in FIG. 8, fine and sharp protrusions disappear from the surface of the substrate while a certain roughness remains on the surface of the substrate after the laser beam irradiation.

FIGS. 9 and 10 are photographic views which three-dimensionally show a difference in the surface shape before and after laser beam irradiation. FIG. 9 is the view before the laser beam irradiation, and FIG. 10 is the view after the laser beam irradiation. Such a photographic view can be imaged by using, for example, a laser microscope. As shown in FIG. 9, a random uneven surface including fine and sharp protrusions is formed on the surface of the substrate before the laser beam irradiation. On the other hand, as shown in FIG. 10, fine and sharp protrusions disappear from the surface of the substrate while a certain roughness remains on the surface of the substrate after the laser beam irradiation.

In the present embodiment, the laser beam irradiation is preferably performed so as to satisfy the following requirement (a) and at least one of the following requirements (b) and (c). The laser beam irradiation is more preferably performed so as to satisfy all of the following requirements (a), (b), and (c).

(a) The surface roughness Ra' of the surface to be treated after the laser beam irradiation is 0.80 times or more and 1.20 times or less the initial surface roughness Ra. Preferably, the surface roughness Ra' of the surface to be treated after the laser beam irradiation is 0.90 times or more and 1.10 times or less the initial surface roughness Ra.

(b) The surface roughness RSm' of the surface to be treated after the laser beam irradiation is 1.10 times or more the initial surface roughness RSm. Preferably, the surface roughness RSm' of the surface to be treated after the laser beam irradiation is 1.20 times or more the initial surface roughness RSm.

(c) The surface roughness Pc' of the surface to be treated after the laser beam irradiation is 0.90 times or less the initial surface roughness Pc. Preferably, the surface roughness Pc' of the surface to be treated after the laser beam irradiation is 0.60 times or less the initial surface roughness Pc.

In the present embodiment, the laser beam irradiation is preferably performed so as to satisfy the following requirement (d) and at least one of the following requirements (e) and (f). The laser beam irradiation is more preferably performed so as to satisfy all of the following requirements (d), (e), and (f).

(d) The surface roughness Sa' of the surface to be treated after the laser beam irradiation is 0.80 times or more and 1.20 times or less the initial surface roughness Sa. Preferably, the surface roughness Sa' of the surface to be treated after the laser beam irradiation is 0.90 times or more and 1.10 times or less the initial surface roughness Sa.

(e) The surface roughness Spc' of the surface to be treated after the laser beam irradiation is 0.90 times or less the initial surface roughness Spc. Preferably, the surface roughness Spc' of the surface to be treated after the laser beam irradiation is 0.80 times or less the initial surface roughness Spc.

(f) The surface roughness Spd' of the surface to be treated after the laser beam irradiation is 0.90 times or less the initial surface roughness Spd. Preferably, the surface roughness Spd' of the surface to be treated after the laser beam irradiation is 0.80 times or less the initial surface roughness Spd.

In the present invention, each of the surface roughnesses Ra and Ra' is defined as an arithmetic average roughness (the average of the absolute values of $Z(x)$ at the reference length) represented by the following formula prescribed in JIS(Japanese Industrial Standards) B 0601. Ra and Ra' are parameters in the height direction when the cross section is viewed, and a large value of each of Ra and Ra' means that a difference between recessed portions and protruding portions of the uneven surface in the height direction per unit length is remarkable.

The value of the initial surface roughness Ra is 2.0 μm or more. According to the purpose of use of the object to be subjected to surface treatment, the value of the initial surface roughness Ra may be, for example, 3.0 μm or more, 4.0 μm or more, or 5.0 μm or more, and may be, for example, 20.0 μm or less, 15.0 μm or less, or 10.0 μm or less.

$$R_a = \frac{1}{l}\int_0^l |z(x)|dx \qquad \text{[Mathematical Formula 1]}$$

In the present invention, each of the surface roughnesses RSm and RSm' is defined as an average length of roughness curve elements (the average of lengths Xs of contour curve elements at the reference length), represented by the following formula prescribed in JIS B 0601. RSm and RSm' are parameters in the horizontal direction when the cross section is viewed, and a large value of each of RSm and RSm' means that unevenness of the surface per unit length is gentle.

$$RSm = \frac{1}{m}\sum_{i=1}^{m} Xsi \qquad \text{[Mathematical Formula 2]}$$

The value of the initial surface roughness RSm is appropriately set according to the purpose of use of the object to be subjected to surface treatment, and is, for example, 100 μm or more, and is, for example, 600 μm or less.

In the present invention, each of the surface roughnesses Pc and Pc' is defined as a peak count (the number of peaks in the evaluation length, which is counted by a method in which where the negative reference level −H is exceeded and then the positive reference level +H is exceeded is regarded as one peak) prescribed in ASME B46.1. A large value of each of Pc and Pc' means that the number of protruding portions of the uneven surface per unit length is large.

The value of the initial surface roughness Pc is appropriately set according to the purpose of use of the object to be subjected to surface treatment, and is, for example, 30 or more, and is, for example, 100 or less.

In the present invention, each of the surface roughnesses Sa and Sa' is defined as an arithmetic average roughness (the average of the absolute values of differences in height of each point with respect to the average height of the surface) represented by the following formula prescribed in ISO 25178. Sa and Sa' are parameters in the height direction when the cross section is viewed, and a large value of each of Sa and Sa' means that a difference between recessed portions and protruding portions of the uneven surface of the surface per unit area is remarkable.

$$Sa = \frac{1}{A} \int\int_A |Z(x, y)| dx dy \qquad \text{[Mathematical Formula 3]}$$

The value of the initial surface roughness Sa is 2.0 μm or more. According to the purpose of use of the object to be subjected to surface treatment, the value of the initial surface roughness Sa may be, for example, 3.0 μm or more, 4.0 μm or more, or 5.0 μm or more, and may be, for example, 20.0 μm or less, 15.0 μm or less, or 10.0 μm or less.

In the present invention, each of the surface roughnesses Spc and Spc' is defined as an arithmetic average curvature of peak tops (the average of principal curvatures of the peak tops of the surface), represented by the following formula prescribed in ISO 25178. A large value of each of Spc and Spc' means that points in contact with other objects are sharp, and a small value of each of Spc and Spc' means that points in contact with other objects are rounded.

$$S_{pc} = -\frac{1}{2}\frac{1}{n}\sum_{k=1}^{n}\left(\frac{\partial^2 z(x, y)}{\partial x^2} + \frac{\partial^2 z(x, y)}{\partial y^2}\right) \qquad \text{[Mathematical Formula 4]}$$

The value of the initial surface roughness Spc is appropriately set according to the purpose of use of the object to be subjected to surface treatment, and is, for example, 2000/mm or more, and is, for example, 12000/mm or less.

In the present invention, each of the surface roughnesses Spd and Spd' is defined as a density of peak tops per unit area (the number n of peak tops per unit area of the surface), represented by the following formula prescribed in ISO 25178. A large value of each of Spd and Spd' means that the number of points in contact with other objects is large, and a small value of each of Spd and Spd' means that the number of points in contact with other objects is small.

$$Spd = n/\text{mm}^2 \qquad \text{[Mathematical Formula 5]}$$

The value of the initial surface roughness Spd is appropriately set according to the purpose of use of the object to be subjected to surface treatment, and is, for example, 100000/mm² or more, and is, for example, 200000/mm² or less.

The fact that the laser beam irradiation is performed so as to satisfy the requirement (a) and further satisfy at least one of the requirements (b) and (c) means that the surface of the substrate to be treated becomes to be a smoothly uneven surface and/or becomes to be an uneven surface in which the number of points in contact with the object contacting with the surface is reduced, while maintaining the degree of surface roughness of the substrate.

The fact that the laser beam irradiation is performed so as to satisfy the requirement (d) and further satisfy at least one of the requirements (e) and (f) means that the surface of the substrate to be treated becomes to be an uneven surface having protruding portions in which points in contact with the object contacting, with the surface are rounded and/or becomes to be an uneven surface in which the number of points in contact with the object contacting with the surface is reduced, while maintaining the degree of surface roughness of the substrate.

An article having an uneven surface formed in this way has low aggression against the object contacting with the surface, is safe, and tends to have a beautiful appearance. When such an article having an uneven surface is used as a structural member of some conveyance facility such as a roll, effect of remaining grip performance (that is, effect of preventing slip) of an article to be conveyed can be easily obtained. Further, when such an article having an uneven surface is used as some kind of sliding component, effect of retaining a lubricant such as an oil can be easily obtained.

The above embodiments and the following examples are examples and are not restrictive. The surface treatment method of the present invention is applied to parts, equipment, and the like in various fields such as steel industry, textile industry, paper manufacturing industry, automobile industry, aircraft industry, semiconductor industry, medical industry, food industry, and general industrial machinery industry.

EXAMPLES

Hereinafter, effects of the present invention will be described in more detail with reference to a plurality of examples of the present invention and comparative examples for comparison thereof.

Demonstration Example 1 (Line Roughness Parameter)

A plate material having a size of 50 mm in length×50 mm in width×5 mm in thickness was prepared, a surface of the plate material was roughened by blasting, and then a plurality of test pieces each having a coating layer made of a thermal sprayed coating formed on the surface of the plate material by a thermal spraying method were prepared (Examples 1 to 12, 15, 16, and Comparative Examples 1 to 8).

A plate material having a size of 50 mm in length×50 mm in width×5 mm in thickness was prepared, and a plurality of test pieces each having a surface roughened by blasting were prepared (Examples 13 and 14).

The surface roughness of each test piece was measured by using a contact stylus type surface roughness meter (SURF-COM 1400D, commercially available from TOKYO SEIMITSU CO., LTD.). The measured surface roughness parameters are Ra, RSm, and Pc.

Each test piece was subjected to the surface treatment by the laser beam irradiation to adjust the surface roughness. A continuously oscillating fiber laser was used as the laser.

The surface roughness of each test piece after the surface treatment was measured by using the contact stylus type surface roughness meter (SURFCOM 1400D, commercially available from TOKYO SEIMITSU CO., LTD.). The measured surface roughness parameters are likewise Ra, RSm, and Pc.

In Table 1, there is summarized a surface material, the surface roughnesses, and laser irradiation conditions of each test piece prepared and evaluated as described above.

TABLE 1

| No. | Surface material | Laser parameter | | | | |
|---|---|---|---|---|---|---|
| | | Spot diameter (μm) | Power density in range with radius of 25 μm from center: CP (kW/cm²) | Power density within spot diameter: SP (kW/cm²) | SP/CP | Action time in range with radius of 25 μm from center (s) |
| Ex. 1 | WC cermet (WC—NiCr) | 300 | 12000 | 1200 | 0.10 | $3.3 \times 10^{-6}$ |
| Ex. 2 | $Cr_3C_2$ cermet ($Cr_3C_2$—CoNiCrAlY) | 300 | 12000 | 1200 | 0.10 | $3.3 \times 10^{-6}$ |
| Ex. 3 | $Cr_3C_2$ cermet ($Cr_3C_2$—CoNiCrAlY) | 150 | 35600 | 3000 | 0.08 | $3.3 \times 10^{-6}$ |
| Ex. 4 | $Cr_3C_2$ cermet ($Cr_3C_2$—CoNiCrAlY) | 450 | 5200 | 480 | 0.09 | $3.3 \times 10^{-6}$ |
| Ex. 5 | $Cr_3C_2$ cermet ($Cr_3C_2$—CoNiCrAlY) | 600 | 3200 | 360 | 0.11 | $3.3 \times 10^{-6}$ |
| Ex. 6 | $Cr_3C_2$ cermet ($Cr_3C_2$—CoNiCrAlY) | 300 | 12000 | 1200 | 0.10 | $1.0 \times 10^{-5}$ |
| Ex. 7 | $Cr_3C_2$ cermet ($Cr_3C_2$—CoNiCrAlY) | 300 | 12000 | 1200 | 0.10 | $3.3 \times 10^{-6}$ |
| Ex. 8 | $Cr_3C_2$ cermet ($Cr_3C_2$—CoNiCrAlY) | 300 | 12000 | 1200 | 0.10 | $2.5 \times 10^{-6}$ |
| Ex. 9 | $Cr_3C_2$ cermet ($Cr_3C_2$—CoNiCrAlY) | 300 | 12000 | 1200 | 0.10 | $2.0 \times 10^{-6}$ |
| Ex. 10 | $Cr_3C_2$ cermet ($Cr_3C_2$—CoNiCrAlY) | 300 | 12000 | 1200 | 0.10 | $1.7 \times 10^{-6}$ |
| Ex. 11 | $Cr_3C_2$ cermet ($Cr_3C_2$—CoNiCrAlY) | 300 | 12000 | 1200 | 0.10 | $3.3 \times 10^{-6}$ |
| Ex. 12 | $Cr_3C_2$ cermet ($Cr_3C_2$—CoNiCrAlY) | 300 | 12000 | 1200 | 0.10 | $3.3 \times 10^{-6}$ |

| No. | Surface roughness parameter (before irradiation) | | | Surface roughness parameter (after irradiation) | | | | | |
|---|---|---|---|---|---|---|---|---|---|
| | Ra (μm) | RSm (μm) | Pc | Ra' (μm) | Ra change rate | RSm' (μm) | RSm change rate | Pc' | Pc change rate |
| Ex. 1 | 5.0 | 163 | 82 | 4.8 | 0.95 | 225 | 1.38 | 29 | 0.35 |
| Ex. 2 | 5.1 | 144 | 87 | 4.3 | 0.83 | 241 | 1.67 | 26 | 0.30 |
| Ex. 3 | 5.1 | 144 | 87 | 6.1 | 1.20 | 173 | 1.20 | 25 | 0.29 |
| Ex. 4 | 5.1 | 144 | 87 | 5.9 | 1.16 | 218 | 1.51 | 23 | 0.26 |
| Ex. 5 | 5.1 | 144 | 87 | 5.4 | 1.06 | 158 | 1.10 | 45 | 0.52 |
| Ex. 6 | 5.1 | 144 | 87 | 4.5 | 0.88 | 245 | 1.70 | 16 | 0.18 |
| Ex. 7 | 5.1 | 144 | 87 | 4.9 | 0.96 | 272 | 1.89 | 23 | 0.26 |
| Ex. 8 | 5.1 | 144 | 87 | 5.0 | 0.98 | 217 | 1.51 | 22 | 0.25 |
| Ex. 9 | 5.1 | 144 | 87 | 5.2 | 1.02 | 204 | 1.42 | 28 | 0.32 |
| Ex. 10 | 5.1 | 144 | 87 | 5.4 | 1.06 | 193 | 1.34 | 25 | 0.29 |
| Ex. 11 | 2.1 | 315 | 40 | 2.2 | 1.05 | 370 | 1.17 | 37 | 0.93 |
| Ex. 12 | 10.8 | 198 | 48 | 10.2 | 0.94 | 280 | 1.41 | 38 | 0.79 |

| No. | Surface material | Laser parameter | | | | |
|---|---|---|---|---|---|---|
| | | Spot diameter (μm) | Power density in range with radius of 25 μm from center: CP (kW/cm²) | Power density within spot diameter: SP (kW/cm²) | SP/CP | Action time in range with radius of 25 μm from center (s) |
| Ex. 13 | SS400 | 300 | 12000 | 1200 | 0.10 | $3.3 \times 10^{-6}$ |
| Ex. 14 | SUS304 | 300 | 12000 | 1200 | 0.10 | $3.3 \times 10^{-6}$ |
| Ex. 15 | Yttria-stabilized zirconia (8YZ) | 300 | 8800 | 900 | 0.10 | $3.3 \times 10^{-6}$ |
| Ex. 16 | Yttria-stabilized zirconia (8YZ) | 450 | 3800 | 360 | 0.09 | $3.3 \times 10^{-6}$ |
| Com. Ex. 1 | $Cr_3C_2$ cermet ($Cr_3C_2$—CoNiCrAlY) | 100 | 120000 | 5200 | 0.04 | $3.3 \times 10^{-6}$ |
| Com. Ex. 2 | $Cr_3C_2$ cermet ($Cr_3C_2$—CoNiCrAlY) | 900 | 980 | 200 | 0.20 | $3.3 \times 10^{-6}$ |
| Com. Ex. 3 | $Cr_3C_2$ cermet ($Cr_3C_2$—CoNiCrAlY) | 300 | 12000 | 1200 | 0.10 | $1.7 \times 10^{-5}$ |
| Com. Ex. 4 | $Cr_3C_2$ cermet ($Cr_3C_2$—CoNiCrAlY) | 100 | 43000 | 1900 | 0.04 | $3.3 \times 10^{-6}$ |
| Com. Ex. 5 | $Cr_3C_2$ cermet ($Cr_3C_2$—CoNiCrAlY) | 100 | 120000 | 5200 | 0.04 | $3.3 \times 10^{-6}$ |
| Com. Ex. 6 | Yttria-stabilized zirconia (8YZ) | 100 | 88900 | 3900 | 0.04 | $3.3 \times 10^{-6}$ |
| Com. Ex. 7 | Yttria-stabilized zirconia (8YZ) | 150 | 26000 | 2250 | 0.09 | $3.3 \times 10^{-6}$ |
| Com. Ex. 8 | Yttria-stabilized zirconia (8YZ) | 300 | 8800 | 900 | 0.10 | $3.3 \times 10^{-6}$ |

| No. | Surface roughness parameter (before irradiation) | | | Surface roughness parameter (after irradiation) | | | | | |
|---|---|---|---|---|---|---|---|---|---|
| | Ra (μm) | RSm (μm) | Pc | Ra' (μm) | Ra change rate | RSm' (μm) | RSm change rate | Pc' | Pc change rate |
| Ex. 13 | 4.9 | 233 | 59 | 5.3 | 1.08 | 254 | 1.09 | 50 | 0.85 |
| Ex. 14 | 3.7 | 206 | 50 | 3.2 | 0.86 | 307 | 1.49 | 43 | 0.86 |
| Ex. 15 | 5.0 | 512 | 34 | 4.0 | 0.80 | 562 | 1.10 | 28 | 0.82 |
| Ex. 16 | 5.0 | 512 | 34 | 4.1 | 0.82 | 578 | 1.13 | 29 | 0.85 |
| Com. Ex. 1 | 5.1 | 144 | 87 | 10.9 | 2.14 | 139 | 0.97 | 27 | 0.31 |
| Com. Ex. 2 | 5.1 | 144 | 87 | 5.1 | 1.00 | 144 | 1.00 | 87 | 1.00 |
| Com. Ex. 3 | 5.1 | 144 | 87 | 2.1 | 0.41 | 283 | 1.97 | 17 | 0.20 |
| Com. Ex. 4 | 5.1 | 144 | 44 | 7.4 | 1.45 | 196 | 1.36 | 63 | 1.43 |
| Com. Ex. 5 | 5.1 | 144 | 44 | 11.5 | 2.25 | 214 | 1.49 | 49 | 1.11 |

TABLE 1-continued

| | | | | | | | | | |
|---|---|---|---|---|---|---|---|---|---|
| Com. Ex. 6 | 1.2 | 288 | 52 | 8.6 | 7.17 | 153 | 0.53 | 66 | 1.27 |
| Com. Ex. 7 | 1.2 | 288 | 52 | 1.4 | 1.17 | 312 | 1.08 | 50 | 0.96 |
| Com. Ex. 8 | 1.2 | 288 | 52 | 1.7 | 1.42 | 324 | 1.13 | 47 | 0.90 |

A state of each test piece after the surface treatment is shown below:

Examples 1 to 10

A change in Ra was small, RSm increased, and Pc decreased greatly.

Example 11

A change in Pc was small, but the change in Ra was small and RSm increased.

Example 12

The change in Ra was small, RSm increased, and Pc decreased.

Example 13

A change in RSm was small, but the change in Ra was small and Pc decreased.

Examples 14 to 16

The change in Ra was small, RSm increased, and Pc decreased.

Comparative Example 1

Since the power density (CP) in the range with the radius of 25 μm from the center of the laser beam spot (φ 50 μm) was too large, Ra increased greatly. In addition, RSm hardly changed.

Comparative Example 2

Since the power density (CP) in the range with the radius of 25 μm from the center of the laser beam spot (φ 50 μm) was too small. Ra did not change, but RSm and Pc also did not change.

Comparative Example 3

Since the action time in the range with the radius of 25 μm from the center of the laser beam spot (φ 50 μm) was too long, the surface melted and Ra decreased greatly.

Comparative Example 4

Since the ratio (SP/CP) of the power density of the entire laser beam spot to the power density (CP) in the range with the radius of 25 μm from the center of the laser beam spot (φ 50 μm) was small, Ra and Pc increased greatly.

Comparative Example 5

Since the power density (CP) in the range with the radius of 25 μm from the center of the laser beam spot (φ 50 μm) was too large, Ra increased greatly and Pc also increased.

Comparative Example 6

Since the ratio (SP/CP) of the power density of the entire laser beam spot to the power density (CP) in the range with the radius of 25 μm from the center of the laser beam spot (φ 50 μm) was small, and further, since the initial surface roughness Ra was small, Ra increased greatly, RSm decreased greatly, and Pc increased greatly.

Comparative Example 7

The initial surface roughness Ra was small, and the changes in RSm and Pc were small.

Comparative Example 8

The initial surface roughness Ra was small and Ra increased greatly.

Demonstration Example 2 (Area Roughness Parameter)

A plate material having a size of 50 mm in length×50 mm in width×5 mm in thickness was prepared, a surface of the plate material was roughened by blasting, and then a plurality of test pieces each having a coating layer made of a thermal sprayed coating formed on the surface of the plate material by a thermal spraying method were prepared (Examples 17 to 28, 31, 32, and Comparative Examples 9 to 16).

A plate material having a size of 50 mm in length×50 mm in width×5 mm in thickness was prepared, and a plurality of test pieces each having a surface roughened by blasting were prepared (Examples 29 and 30).

The surface roughness of each test piece was measured by using a laser microscope (VK-X250/260, commercially available from KEYENCE CORPORATION). The measured surface roughness parameters are Sa, Spc, and Spd.

Each test piece was subjected to the surface treatment by the laser beam irradiation to adjust the surface roughness, A continuously oscillating fiber laser was used as the laser.

The surface roughness of each test piece after the surface treatment was measured by using the laser microscope (VK-X250/260, commercially available from KEYENCE CORPORATION). The measured surface roughness parameters are likewise Sa, Spc, and Spd.

In Table 2, there is summarized a surface material, the surface roughnesses, and laser irradiation conditions of each test piece prepared and evaluated as described above.

TABLE 2

| No. | Surface material | Spot diameter (μm) | Power density in range with radius of 25 μm from center: CP (kW/cm²) | Power density within spot diameter: SP (kW/cm²) | SP/CP | Action time in range with radius of 25 μm from center (s) |
|---|---|---|---|---|---|---|
| Ex. 17 | WC cermet (WC—NiCr) | 300 | 12000 | 1200 | 0.10 | $3.3 \times 10^{-6}$ |
| Ex. 18 | $Cr_3C_2$ cermet ($Cr_3C_2$—CoNiCrAlY) | 300 | 12000 | 1200 | 0.10 | $3.3 \times 10^{-6}$ |
| Ex. 19 | $Cr_3C_2$ cermet ($Cr_3C_2$—CoNiCrAlY) | 150 | 35600 | 3000 | 0.08 | $3.3 \times 10^{-6}$ |
| Ex. 20 | $Cr_3C_2$ cermet ($Cr_3C_2$—CoNiCrAlY) | 450 | 5200 | 480 | 0.09 | $3.3 \times 10^{-6}$ |
| Ex. 21 | $Cr_3C_2$ cermet ($Cr_3C_2$—CoNiCrAlY) | 600 | 3200 | 360 | 0.11 | $3.3 \times 10^{-6}$ |
| Ex. 22 | $Cr_3C_2$ cermet ($Cr_3C_2$—CoNiCrAlY) | 300 | 12000 | 1200 | 0.10 | $1.0 \times 10^{-5}$ |
| Ex. 23 | $Cr_3C_2$ cermet ($Cr_3C_2$—CoNiCrAlY) | 300 | 12000 | 1200 | 0.10 | $3.3 \times 10^{-6}$ |
| Ex. 24 | $Cr_3C_2$ cermet ($Cr_3C_2$—CoNiCrAlY) | 300 | 12000 | 1200 | 0.10 | $2.5 \times 10^{-6}$ |
| Ex. 25 | $Cr_3C_2$ cermet ($Cr_3C_2$—CoNiCrAlY) | 300 | 12000 | 1200 | 0.10 | $2.0 \times 10^{-6}$ |
| Ex. 26 | $Cr_3C_2$ cermet ($Cr_3C_2$—CoNiCrAlY) | 300 | 12000 | 1200 | 0.10 | $1.7 \times 10^{-6}$ |
| Ex. 27 | $Cr_3C_2$ cermet ($Cr_3C_2$—CoNiCrAlY) | 300 | 12000 | 1200 | 0.10 | $3.3 \times 10^{-6}$ |
| Ex. 28 | $Cr_3C_2$ cermet ($Cr_3C_2$—CoNiCrAlY) | 300 | 12000 | 1200 | 0.10 | $3.3 \times 10^{-6}$ |

| No. | Surface roughness parameter (before irradiation) | | | Surface roughness parameter (after irradiation) | | | | | |
|---|---|---|---|---|---|---|---|---|---|
| | Sa (μm) | Spc (/mm) | Spd (/mm²) | Sa' (μm) | Sa change rate | Spc' (/mm) | Spc change rate | Spd' (/mm²) | Spd change rate |
| Ex. 17 | 5.0 | 5688 | 122457 | 5.2 | 1.04 | 2443 | 0.43 | 58016 | 0.47 |
| Ex. 18 | 5.6 | 6219 | 121249 | 4.6 | 0.82 | 1736 | 0.28 | 67082 | 0.55 |
| Ex. 19 | 5.6 | 6219 | 121249 | 6.7 | 1.20 | 2393 | 0.38 | 53234 | 0.44 |
| Ex. 20 | 5.6 | 6219 | 121249 | 5.9 | 1.05 | 2396 | 0.39 | 79300 | 0.65 |
| Ex. 21 | 5.6 | 6219 | 121249 | 5.5 | 0.98 | 4774 | 0.77 | 97200 | 0.80 |
| Ex. 22 | 5.6 | 6219 | 121249 | 4.6 | 0.82 | 1419 | 0.23 | 84904 | 0.70 |
| Ex. 23 | 5.6 | 6219 | 121249 | 4.8 | 0.86 | 1750 | 0.28 | 72982 | 0.60 |
| Ex. 24 | 5.6 | 6219 | 121249 | 5.1 | 0.91 | 2000 | 0.32 | 76437 | 0.63 |
| Ex. 25 | 5.6 | 6219 | 121249 | 5.4 | 0.96 | 2521 | 0.41 | 72113 | 0.59 |
| Ex. 26 | 5.6 | 6219 | 121249 | 4.9 | 0.88 | 2912 | 0.47 | 82354 | 0.68 |
| Ex. 27 | 2.1 | 2810 | 180911 | 2.3 | 1.10 | 1642 | 0.58 | 124029 | 0.69 |
| Ex. 28 | 10.4 | 8495 | 129039 | 9.6 | 0.92 | 5607 | 0.66 | 118482 | 0.92 |

| No. | Surface material | Spot diameter (μm) | Power density in range with radius of 25 μm from center: CP (kW/cm²) | Power density within spot diameter: SP (kW/cm²) | SP/CP | Action time in range with radius of 25 μm from center (s) |
|---|---|---|---|---|---|---|
| Ex. 29 | SS400 | 300 | 12000 | 1200 | 0.10 | $3.3 \times 10^{-6}$ |
| Ex. 30 | SUS304 | 300 | 12000 | 1200 | 0.10 | $3.3 \times 10^{-6}$ |
| Ex. 31 | Yttria-stabilized zirconia (8YZ) | 300 | 8800 | 900 | 0.10 | $3.3 \times 10^{-6}$ |
| Ex. 32 | Yttria-stabilized zirconia (8YZ) | 450 | 3800 | 360 | 0.09 | $3.3 \times 10^{-6}$ |
| Com. Ex. 9 | $Cr_3C_2$ cermet ($Cr_3C_2$—CoNiCrAlY) | 100 | 120000 | 5200 | 0.04 | $3.3 \times 10^{-6}$ |
| Com. Ex. 10 | $Cr_3C_2$ cermet ($Cr_3C_2$—CoNiCrAlY) | 900 | 980 | 200 | 0.20 | $3.3 \times 10^{-6}$ |
| Com. Ex. 11 | $Cr_3C_2$ cermet ($Cr_3C_2$—CoNiCrAlY) | 300 | 12000 | 1200 | 0.10 | $1.7 \times 10^{-5}$ |
| Com. Ex. 12 | $Cr_3C_2$ cermet ($Cr_3C_2$—CoNiCrAlY) | 100 | 43000 | 1900 | 0.04 | $3.3 \times 10^{-6}$ |
| Com. Ex. 13 | $Cr_3C_2$ cermet ($Cr_3C_2$—CoNiCrAlY) | 100 | 120000 | 5200 | 0.04 | $3.3 \times 10^{-6}$ |
| Com. Ex. 14 | Yttria-stabilized zirconia (8YZ) | 100 | 88900 | 3900 | 0.04 | $3.3 \times 10^{-6}$ |
| Com. Ex. 15 | Yttria-stabilized zirconia (8YZ) | 150 | 26000 | 2250 | 0.09 | $3.3 \times 10^{-6}$ |
| Com. Ex. 16 | Yttria-stabilized zirconia (8YZ) | 300 | 8800 | 900 | 0.10 | $3.3 \times 10^{-6}$ |

| No. | Surface roughness parameter (before irradiation) | | | Surface roughness parameter (after irradiation) | | | | | |
|---|---|---|---|---|---|---|---|---|---|
| | Sa (μm) | Spc (/mm) | Spd (/mm²) | Sa' (μm) | Sa change rate | Spc' (/mm) | Spc change rate | Spd' (/mm²) | Spd change rate |
| Ex. 29 | 5.0 | 3803 | 102017 | 5.7 | 1.14 | 2662 | 0.70 | 65958 | 0.65 |
| Ex. 30 | 3.1 | 3587 | 104351 | 3.2 | 1.02 | 1781 | 0.50 | 72658 | 0.70 |
| Ex. 31 | 5.0 | 10568 | 183083 | 4.4 | 0.88 | 4331 | 0.41 | 126940 | 0.69 |
| Ex. 32 | 5.0 | 10568 | 183083 | 4.7 | 0.94 | 6029 | 0.57 | 134570 | 0.74 |
| Com. Ex. 9 | 5.6 | 6219 | 121249 | 12.6 | 2.25 | 3616 | 0.58 | 59035 | 0.49 |
| Com. Ex. 10 | 5.6 | 6219 | 121249 | 5.6 | 1.00 | 6219 | 1.00 | 121249 | 1.00 |
| Com. Ex. 11 | 5.6 | 6219 | 121249 | 2.6 | 0.46 | 1247 | 0.20 | 103966 | 0.86 |
| Com. Ex. 12 | 5.6 | 6219 | 121249 | 8.2 | 1.46 | 6154 | 0.99 | 133559 | 1.10 |
| Com. Ex. 13 | 5.6 | 6219 | 121249 | 14.4 | 2.57 | 7322 | 1.18 | 115252 | 0.95 |

TABLE 2-continued

| | | | | | | | | | |
|---|---|---|---|---|---|---|---|---|---|
| Com. Ex. 14 | 1.7 | 4170 | 164134 | 9.8 | 5.76 | 4821 | 1.16 | 93509 | 0.57 |
| Com. Ex. 15 | 1.7 | 4170 | 164134 | 2.2 | 1.29 | 2336 | 0.56 | 141129 | 0.86 |
| Com. Ex. 16 | 1.7 | 4170 | 164134 | 2.1 | 1.24 | 2943 | 0.71 | 132225 | 0.81 |

A state of each test piece after the surface treatment is shown below.

Examples 17 to 27

A change in Sa was small, and Spc and Spd decreased greatly.

Example 28

A change in Spd was small, but the change in Sa was small and Spc decreased greatly.

Examples 29 to 32

The change in Sa was small, and Spc and Spd decreased greatly.

Comparative Example 9

Since the power density (CP) in the range with the radius of 25 nm from the center of the laser beam spot (φ 50 μm) was too large, Sa increased greatly.

Comparative Example 10

Since the power density (CP) in the range with the radius of 25 μm from the center of the laser beam spot (φ 50 μm) was too small. Sa did not change, but Spc and Spd also did not change.

Comparative Example 11

Since the action time in the range with the radius of 25 μm from the center of the laser beam spot (φ 50 μm) was too long, the surface melted and Sa decreased greatly.

Comparative Example 12

Since the ratio (SP/CP) of the power density of the entire laser beam spot to the power density (CP) in the range with the radius of 25 μm from the center of the laser beam spot (φ 50 μm) was small, Sa increased, Spc hardly changed, and Spd increased.

Comparative Example 13

Since the power density (CP) in the range with the radius of 25 μm from the center of the laser beam spot (φ 50 μm) was too large, Sa increased greatly and Spc also increased. In addition, the change in Spd was small.

Comparative Example 14

Since the ratio (SP/CP) of the power density of the entire laser beam spot to the power density (CP) in the range with the radius of 25 μm from the center of the laser beam spot (φ 50 μm) was small, and further, since the initial surface roughness Sa was small, Sa increased greatly and Spc also increased.

Comparative Examples 15 and 16

Since the initial surface roughness Sa was small, Sa increased greatly.

DESCRIPTION OF REFERENCE CHARACTERS

2 Substrate
2a Surface of substrate
10 Laser processing apparatus
11 Galvano scanner
12 fθ Lens
13 XY table
14 Mirror
15 Galvano motor
16 Laser beam

What is claimed is:

1. A surface treatment method comprising:
   irradiating a surface of a substrate, which has unevenness with a surface roughness Ra of 2.0 μm or more and a surface roughness Sa of 2.0 μm or more, with a laser beam satisfying all of the following requirements (i) to (iii) to process the surface:
   (i) a power density in a range with a radius of 25 μm from a center of a laser beam spot is $1.0 \times 10^3$ to $1.0 \times 10^5$ kW/cm$^2$;
   (ii) a power density of an entire laser beam spot is 0.08 to 0.12 times the power density in the range with the radius of 25 μm from the center of the laser beam spot; and
   (iii) an action time in the range with the radius of 25 μm from the center of the laser beam spot is $1.7 \times 10^{-6}$ to $1.0 \times 10^{-5}$ seconds.

2. The surface treatment method according to claim 1, wherein the unevenness of the surface of the substrate is formed by at least one pretreatment selected from laser processing, machine processing, blasting, and etching.

3. The surface treatment method according to claim 1, wherein the surface of the substrate, which has the unevenness, is a coating layer formed on a body of the substrate.

4. The surface treatment method according to claim 3, wherein the coating layer is a thermally sprayed coating.

* * * * *